(No Model.)

R. W. JOHNSON.
SURGICAL ABSORBENT DRESSING.

No. 582,926.  Patented May 18, 1897.

WITNESSES
A. B. Degges
L. D. Hinrichs

INVENTOR
Robert W. Johnson
by E. E. Masson, Attorney.

UNITED STATES PATENT OFFICE.

ROBERT W. JOHNSON, OF NEW BRUNSWICK, NEW JERSEY.

SURGICAL ABSORBENT DRESSING.

SPECIFICATION forming part of Letters Patent No. 582,926, dated May 18, 1897.

Application filed November 19, 1895. Serial No. 569,447. (No specimens.)

*To all whom it may concern:*

Be it known that I, ROBERT W. JOHNSON, a citizen of the United States, residing at New Brunswick, in the county of Middlesex, State of New Jersey, have invented certain new and useful Improvements in Substitutes for Surgeons' Sponges, of which the following is a specification, reference being had therein to the accompanying drawings.

The object of my invention is to produce as a substitute for the sponges used by surgeons during surgical operations or in the treatment of wounds a mop having greater absorbent power and that is inexpensive and sterile and that can be kept more easily in a sterilized condition. I attain this object in the sponge substitute produced in accordance with my invention and consisting of a tablet or disk of closely-compressed and sterilized absorbent cotton having one or more of its faces protected with other material, as hereinafter described, and pointed out in the claims.

Figure 1:
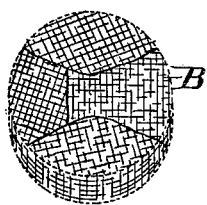
Figure 2:
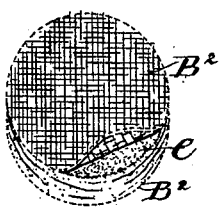
Figure 3:
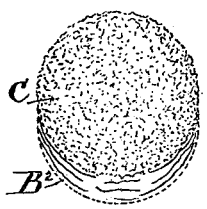
Figure 3:
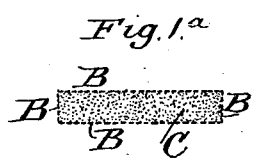
Figure 3:
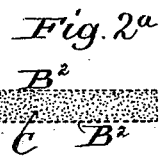
Figure 3:
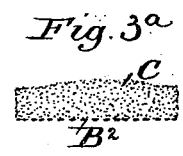
Figure 4:
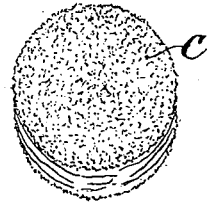
Figure 4:

In the accompanying drawings, Figure 1 is a perspective view of a disk or tablet of compressed sterilized cotton or sponge substitute wholly inclosed in sterilized gauze adhering thereto by compression in accordance with my invention. Fig. 1$^a$ is a transverse section of the same. Fig. 2 is a perspective view of a disk or tablet of compressed and sterilized absorbent cotton or sponge substitute having its top and bottom faces protected by disks of sterilized gauze adhering thereto by compression in accordance with my invention. Fig. 2$^a$ is a transverse section of the same. Fig. 3 is a perspective view of a disk or tablet of compressed and sterilized and absorbent cotton or sponge substitute having only its bottom face protected by a disk of sterilized gauze adhering thereto by compression. Fig. 3$^a$ is a transverse section of the same. Fig. 4 is a perspective view of a disk or tablet of compressed and sterilized absorbent cotton retained without gauze in its dense tablet form by the great pressure to which it has been subjected. Fig. 4$^a$ is a transverse section of the same.

In all the figures of said drawings, C represents the compressed tablet of sterilized absorbent cotton constituting the main portion of the sponge substitute, and in Figs. 1 and 1$^a$, B represents sterilized gauze adhering thereto by compression and by which it is wholly inclosed. In Figs. 2 and 2$^a$ the compressed tablet of absorbent cotton C has only its top and bottom protected by disks B$^2$ of sterilized gauze. In Figs. 3 and 3$^a$ the compressed tablet C has only one of its faces protected by a disk B$^2$ of sterilized gauze compressed therewith, and thereby adhering thereto. The tablet of absorbent cotton shown in Figs. 4 and 4$^a$ retains its form and consistency from the great pressure to which it has been subjected, and its interior retains its sterilized condition from its outer layer of cotton that forms a well-known protection against the passage of germs and microbes.

I have used various means to obtain the sponge substitute or compressed cotton tablets, and although I prefer to use absorbent cotton that has primarily been rendered as nearly sterile as possible by well-known means I have also discovered that absorbent cotton could be sterilized by heavy pressure applied thereto.

The means that I prefer to use to obtain the sponge substitute or cotton tablets consists in taking sheets of absorbent cotton fibers of suitable thickness or superposed sheets, cutting them with a die, and thus bunching them and at the same time subjecting them to very heavy pressure. Said sheets of cotton may be without covering or may be protected by sheets of sterilized gauze on one or both of the faces that are cut by the die and pressed at the same time with the cotton, the pressure causing it to adhere firmly to said cotton.

The sterilized cotton tablets can also be obtained by packing the absorbent cotton in a die and subjecting it to heavy pressure, and thus bunching it in the form of tablets having substantially the consistency of blotting-paper.

Cotton tablets wholly inclosed in sterilized gauze, as shown in Fig. 1, can be obtained by inclosing bunches of absorbent cotton in said gauze, properly folded around it, and subjecting the bunches and their wrapper together to heavy pressure in a die, or the bunches can first be given their form of tablet, as shown in Fig. 4, and be wrapped in sterilized gauze, and the compound tablet and wrapper be subjected a second time to pressure in a suitable die.

The cotton tablets wholly inclosed can be also obtained by inclosing bunches of absorbent cotton in small bags of sterilized gauze, tying the bags, and subjecting both together to heavy pressure in a die. The material will then take the form of tablets, substantially as shown in Fig. 1.

Having now fully described my invention I claim—

1. A substitute for a surgeon's sponge consisting of a disk or tablet of closely-compressed and sterilized absorbent cotton and having one or more of its faces protected with disks of other material pressed upon and adhering thereto substantially as described.

2. A substitute for a surgeon's sponge consisting of a tablet of closely-compressed and sterilized absorbent cotton having its sterilization completed by heavy pressure substantially as described.

In testimony whereof I affix my signature in presence of two witnesses.

ROBERT W. JOHNSON.

Witnesses:
B. G. SIMMONS,
C. N. SIMMONS.